(12) United States Patent
Shoji et al.

(10) Patent No.: US 7,945,917 B2
(45) Date of Patent: May 17, 2011

(54) MONITORING METHOD, MONITORING SYSTEM, SYSTEM PROGRAM AND RECORDING MEDIUM HAVING PROGRAM RECORDED THEREON

(75) Inventors: Koichiro Shoji, Kanagawa (JP); Takashi Nozaki, Kanagawa (JP)

(73) Assignee: Science Park Corporation, Kanagawa (JP)

( * ) Notice: Subject to any disclaimer, the term of this patent is extended or adjusted under 35 U.S.C. 154(b) by 837 days.

(21) Appl. No.: 11/916,174

(22) PCT Filed: May 30, 2006

(86) PCT No.: PCT/JP2006/310809
§ 371 (c)(1),
(2), (4) Date: Nov. 30, 2007

(87) PCT Pub. No.: WO2006/129676
PCT Pub. Date: Dec. 7, 2006

(65) Prior Publication Data
US 2010/0162273 A1    Jun. 24, 2010

(30) Foreign Application Priority Data
May 31, 2005 (JP) .................. 2005-160638

(51) Int. Cl.
G06F 3/00 (2006.01)
(52) U.S. Cl. ........................ 719/321; 715/700
(58) Field of Classification Search .................. 719/321; 715/700
See application file for complete search history.

(56) References Cited

U.S. PATENT DOCUMENTS

| 5,982,392 A | 11/1999 | Anfossi et al. |
| 6,141,022 A | 10/2000 | Anfossi et al. |
| 2005/0120359 A1 | 6/2005 | Shoji et al. |

FOREIGN PATENT DOCUMENTS

| JP | 793253 A | 4/1995 |
| JP | 10105137 A | 4/1998 |
| JP | 10275093 A | 10/1998 |
| JP | 200391433 A | 3/2003 |
| JP | 2003308228 A | 10/2003 |
| JP | 2003308325 A | 10/2003 |
| WO | 03073289 A1 | 9/2003 |

OTHER PUBLICATIONS

Sean M.Dorward, The Inferno tm Operating System, 1997.*
"Shinseihin Web Surfing Kanri Soft Keyword Shitei de Access Seigyo", Nikkei Communication, May 3, 1999, Nikkei Business Publication, Inc., No. 293, p. 141, ISSN 0910-7215 [CS-ND-2000-00609-018].

(Continued)

*Primary Examiner* — Sough Hyung
*Assistant Examiner* — Lechi Truong
(74) *Attorney, Agent, or Firm* — Westerman, Hattori, Daniels & Adrian, LLP

(57) ABSTRACT

A screen image for monitoring the usage state of a client computer is acquired, the acquired screen image is efficiently stored, and the stored screen image can be easily searched.

A draw command is acquired by a driverware (22) when a screen image is generated in a client computer (2), and text data is extracted from the draw command. The extracted text data are associated with the draw command and stored in a database (13) of the server (3). The database (13) is searched using a keyword, and the screen image is reproduced from an associated draw command.

14 Claims, 10 Drawing Sheets

OTHER PUBLICATIONS

"Tokushu Shain Kanshi Jidai Hajimaru Seihin Client Sosa Kanshi Tool ga Chukaku Tashutayo nanode Sentaku niwa Chui", Nikkei Computerm Sep. 6, 2004, Nikkei Business Publications, Inc., No. 608, pp. 62 to 67, ISSN 0285-4619 [CS-ND-2004-01608-002].

"Saifumei, Saifumei no IT Kaido o Yuku Shinseiki Communication no Ninaitetachi Keyboard no Tatakiguse o Torokushi Fusei Access no Haning o Tokutei '4th Eye' o Toshite Miru Ningen tono Tsukiaikata", Gekkan CYBIZ SOHO Computing, Jun. 1, 2002, Kabushiki Kaisha Saibizu, vol . 7, No. 8, pp. 108-109 [CS-ND 2002-01069-016].

International Search Report of PCT/JP2006/310809, date of mailing Aug. 29, 2006.

* cited by examiner

FIG.10

REPORT

OOOOY OM OD

COMPUTER: CLIENT A
USER NAME: KOU
LOG-IN TIME: 14.00.03
LOG-OFF TIME: 17.04.01
NUMBER OF IMPROPER OPERATIONS: 3
  ACCESS IP: 204. . . .
  ACCESS TIME BAND: 14.04.13 TO 14.09.34
  ACCESS IP: 176. . . .
  ACCESS TIME BAND: 14.04.13 TO 14.09.34
  ACCESS IP: 168. . . .
  ACCESS TIME BAND: 14.04.13 TO 14.09.34 } 71

COMPUTER: CLIENT B
USER NAME: TAKA
LOG-IN TIME: 12.00.03
LOG-OFF TIME: 14.04.01
NUMBER OF IMPROPER OPERATIONS: 0 } 72

COMPUTER: CLIENT C
USER NAME: NO USER
LOG-IN TIME: Hr Min Sec
LOG-OFF TIME: Hr Min Sec
NUMBER OF IMPROPER OPERATIONS: TIMES } 73

PAGE 1

MONITORING METHOD, MONITORING SYSTEM, SYSTEM PROGRAM AND RECORDING MEDIUM HAVING PROGRAM RECORDED THEREON

TECHNICAL FIELD

The present invention relates to a monitoring method for monitoring a usage state of a computer, a monitoring system to which this method is applied, a program employed in this system, and a computer-readable recording medium in which this program is recorded. More particularly, the present invention relates to a monitoring method, a monitoring system, a system program and a recording medium in which this program is recorded for monitoring a screen image displayed on a display of a client computer connected to a communication network such as a Local Area Network (LAN).

BACKGROUND ART

Systems constructed by a network such as a LAN (Local Area Network) are widely used in buildings that house companies and government agencies and the like, as well as in school campuses or similar. External communication networks such as the Internet can be accessed from client computers connected to these networks, the information and apparatuses and so on of the system being shared by a plurality of users.

The users use a client computer to carry out their work. In addition, the users perform actions necessitated by their work that involve external communication networks as well as shared information and apparatuses and so on of the system being accessed from the client computer. However, a range of problems including reduced work efficiency arise if a user uses a client computer to perform non-work related actions such as accessing web pages not directly related to work or to play computer games and so on.

Other non-work related actions that can be performed by a user of a client computer include illegal actions such as the doctoring, leaking and destruction of information. An inherent problem to these systems is that the state of work being performed by a user of a client computer is not immediately recognizable and, accordingly, regulating against non-work related actions being performed by a user is difficult. A method for accessing non-work related web pages based on an accumulation of web page access records has been devised.

The problems inherent to this method pertain to the difficulty associated with auditing viewed web pages from access records such as web page IP addresses, and to the fact that records of recreational actions such as on-line games are difficult to retain and, accordingly, difficult to audit. Accordingly, a range of systems have been proposed as means for monitoring a usage state of a client computer connected to a network. Cited document 1 discloses a system for monitoring a usage state of a LAN connected-client computer.

In this system, a screen of a monitored apparatus connected to a LAN is displayed on a display of a monitoring apparatus connected to the LAN and, in addition, is recorded and stored on a recording apparatus connected to the LAN. The received display image information is correlatively recorded with time and identifying information specifying the source monitored apparatus in a history database stored in the recording apparatus. The usage state of a client computer can be ascertained from this history database.

Cited document 2 discloses a system for monitoring a plurality of computers using a single server computer. An image displayed on a video display of an agent computer is compressed, sent to the server computer by way of a network, and is either expanded and displayed on a video display or recorded in a storage device in a compressed state. In addition, the title of a processing currently in operation on an agent computer is sent to the server computer and used to complement the lack of information associated with screen compression.

Cited Document 1: Japanese Unexamined Patent Application No. 2003-91433

Cited Document 2: Japanese Unexamined Patent Application No. 2001-229141

DISCLOSURE OF THE INVENTION

Methods for storing screen image displayed on a screen in an image-based format such as a bitmap or a JPEG or similar involve large volumes of data being handled, increase volumes of communication data when the data is transferred via a network, and enormous volumes of data being recorded in a recording apparatus. In conventional methods of this kind, the usage state of a client computer is ascertained while a stored screen image is being reproduced. Although the kind of program that has been initiated can be confirmed from the title of the operated processing stored in a recording apparatus, the content of a program displayed on a screen cannot be ascertained by this method.

Because the screen image of a client computer is stored in an image format, text information displayed on the screen cannot be searched. Tracking a display on a screen involves stored screen images being opened and reproduced screen-by-screen and confirmed. The required screen cannot be easily viewed and displayed using this method of tracking. While logical recognition of text data displayed in a screen image is possible employing an image recognition image processing technique, because of the enormous volume of data involved in the image processing thereof, reading text data from continuously reproduction screen images displayed on a screen is impractical.

The present invention is designed with the conventional art described above in mind to achieve the following objects.

It is an object of the present invention to provide a monitoring method, a monitoring system, a system program and a recording medium in which a program is recorded for acquiring a screen image and efficiently storing the acquired screen image in order to monitor the usage state of a client computer.

It is another object of the present invention to provide a monitoring method, a monitoring system, a system program and a recording medium in which a program is recorded for facilitating the easy search of a stored screen image in order to monitor the usage state of a client computer.

And it is a further object of the present invention to provide a monitoring method, a monitoring system, a system program and a recording medium in which a program is recorded for reproducing a screen image of a stored draw command base in order to monitor the usage state of a client computer.

The following means are adopted in the present invention to achieve the abovementioned objects.

The present invention provides a monitoring method, a monitoring system, a system program and a recording medium in which a program is recorded for monitoring the usage state of a client computer. The present invention monitors the usage state of a client computer on the basis of a computer being actuated by an operating system and display images being displayed on a display apparatus of a computer. The monitoring system of the present invention correlatively stores a screen image displayed on a display apparatus of a computer and text data extracted from this screen image as a database.

The screen image is stored in accordance with a draw command when the computer creates the screen image. In addition, the screen image can be stored as raster data. The draw command is stored as text data in a database. This database is stored in a server. The server is connected to the computer by a network. The server comprises search means for searching a database, and reproducing means for reproducing a screen image from a stored raster data or draw command.

In order to ascertain the usage state of a client computer, a database is searched by search means using a keyword, and a search result of the search is displayed by display means. Furthermore, a display image is reproduced by reproducing means in use of a function such as a draw command associated with text data of a search result of a search and stored in a database. The computer is actuated by a control executed by an operating system. Upon data from an operating system or an application program actuated on an operating system being displayed on a display apparatus of a computer, subsystems (GDI32, GDI) that provide a graphics function of the operating system create a display image.

A screen image is created by a draw command that constitutes a function provided by the GDI32 and GDI. Draw commands are used to display vector data and to display raster data in a screen image. In addition, they are used to display text data. The computer and a server comprise acquisition means configured from interface driver means actuated in a kernel mode of an operating system. Interface driver means provides an interface between an operating system or application program and an input function or output function of a subsystem.

A function of a draw command or the like executed by a subsystem (GDI32, GDI) in order to generate a display image is acquired using an input function or an output function of the subsystem (GDI32, GDI). In other words, a draw command is acquired using input/output functions of the GDI32, GDI or display apparatus driver or the like. Text data is extracted from the acquired function, and the text data and function are correlatively stored in a database. Acquisition of a function such as a draw command is performed by acquisition means. Acquisition means acquires a function using an interface of interface driver means.

A draw command is acquired subsequent to a request for data to be displayed on a screen being output from an application program and data being transferred to the subsystem GDI32 that provides the graphics function of an operating system. Furthermore, if data is handed over from GDI32 to Kernel-mode GDI of the operating system or if GDI is executed, a draw command is acquired.

The computer comprises sending means for sending acquired data acquired by acquisition means to the server. The server comprises receiving means for receiving data sent by sending means of the computer, and storage means for storing acquired data contained in this data in a database. When a screen image is sent from the computer to the server, text data is extracted from the screen image and is correlatively stored with the screen image in a database. The computer may comprise a function for extracting text data from a screen image.

Interface driver means comprises a recording apparatus driver portion for uploading data from a storage device, and an interface portion for outputting data to a graphics device for creating a display image displayable in a display apparatus. Reproducing means of the server comprises a recording apparatus driver portion and an interface portion. In the server, a function stored in a database is acquired by the recording apparatus driver portion and output to the interface portion to create a display image.

In the computer, at least one kind of data from among the application program operation history, operation history input through the input apparatus of the computer, computer communication history, information characteristic of the computer, raster data output from a subsystem and function execution time are acquired by acquisition means. This historical data is correlatively stored with text data or a function in a database. A method for storing a vector data and raster data-stored storage destination link rather than the vector data and raster data contained in a screen image in a database may be adopted.

In order to ascertain the usage state of a computer, a database is searched by search means using a keyword, the search result of the search is displayed by display means, and a display image is reproduced by reproducing means in use of a function associated with text data of the search result of the search and stored in a database. A monitoring system comprises a function for producing a report of the usage state of a computer in accordance with data pertaining to the computer such as historical data, function and screen image and the like stored in a database.

This report is produced in response to an instruction from a monitoring system supervisor or periodically. The server comprises report production means for producing this report. Report production means analyzes the computer-related data and compiles the results thereof as a report. The report is configured from characteristic information of the computer, user information indicating the user using the computer, time information indicating the time and time band in which the user used the computer, and irregular access information indicating execution of improper programs on the computer or information being accessed from the computer from network addresses that generate inappropriate information.

Reproduction of a screen image stored in a database is actualized using a user mode application program or a kernel mode driverware. While the database and screen image are stored in a monitoring system server, a method for storing the same in a recording apparatus mounted locally or externally of the computer may be adopted. In addition, a method for storing the database in another computer on a network may also be adopted. The other computers connected to the database via a network may comprise a function for accessing the database, searching the contents thereof, and reproducing a screen image.

The present invention affords the effects outlined below.

Data volume can be reduced because, different to a conventional image-based storage format, a screen image displayed on a client computer screen is stored on the basis of a command being acquired when the screen image is created.

The usage state of a client computer can be easily searched because text data is able to be extracted from a screen image displayed on a client computer screen, or more particularly from an acquired command, and this text data is able to be correlatively stored in a database with a command-based screen image.

A target screen image can be easily viewed and the usage state of a client computer easily managed because draw command-based screen images of a client computer and text data contained therein are correlatively stored in a database, the database is searched using a keyword, and a screen image is reproduced from a draw command having correlation with a search result.

Because the usage state of a client computer is produced as a report either periodically or in response to an instruction from a supervisor and stored for a predetermined period in accordance with a supervisory policy, the present invention is also able to be used by an auditing agency and security management.

BRIEF DESCRIPTION OF THE DRAWINGS

FIG. 10 is a diagram showing an example of a report 70 illustrating the usage state of a client computer 2.

BEST MODE FOR CARRYING OUT THE INVENTION

The present invention constitutes a monitoring system for monitoring the usage state of a client computer. The monitoring system of the present invention correlatively stores a screen image displayed on a display of a client computer and text data extracted from this screen image as a database. A screen image is created in a client computer by, for example, a GDI32 (abbreviation of Graphics Device Interface 32, see the description provided later), or a GDI (abbreviation of Graphics Device Interface, see the description provided later).

The screen image is created by a draw command that constitutes a function provided by the GDI32 or GDI. Draw commands include the display of vector data and the display of raster data in a screen image. Draw commands also include the display of text data. A screen image is image command-based stored when the screen image is created by the client computer.

The draw command is acquired utilizing an input/output function of a GDI32, a GDI or a display apparatus driver or the like. Screen image-created time information, client computer identification information and user identification information and so on are stored in the database. In addition, a method based on storage of a storage destination link in which vector data and raster data are stored in the database instead of the vector data and raster data contained in the screen image can be adopted.

While the database and screen image are stored in a monitoring server of a monitoring system, a method for the storage thereof in another computer of the network, or a local or affiliated recording apparatus or a client computer can be adopted. The contents displayed on the display of a client computer can be easily ascertained by searching the information stored in the database.

The monitoring system accesses the database from the client computer or the monitoring server and searches the contents thereof, and reproduces a stored screen image. This same operation can be performed from other computers connected via a network to the monitoring server.

A draw command is acquired when a request to display data on a screen is output from an application program and data is transferred to the subsystem GDI32 that provides a graphics-related function of the operating system. A draw command is also acquired when data is transferred from a GDI32 to a GDI in a kernel mode of the operating system, or when a GDI is executed. The reproduction of the screen image stored in the database is actualized by a user mode application program or a kernel mode driverware.

Figure 1:
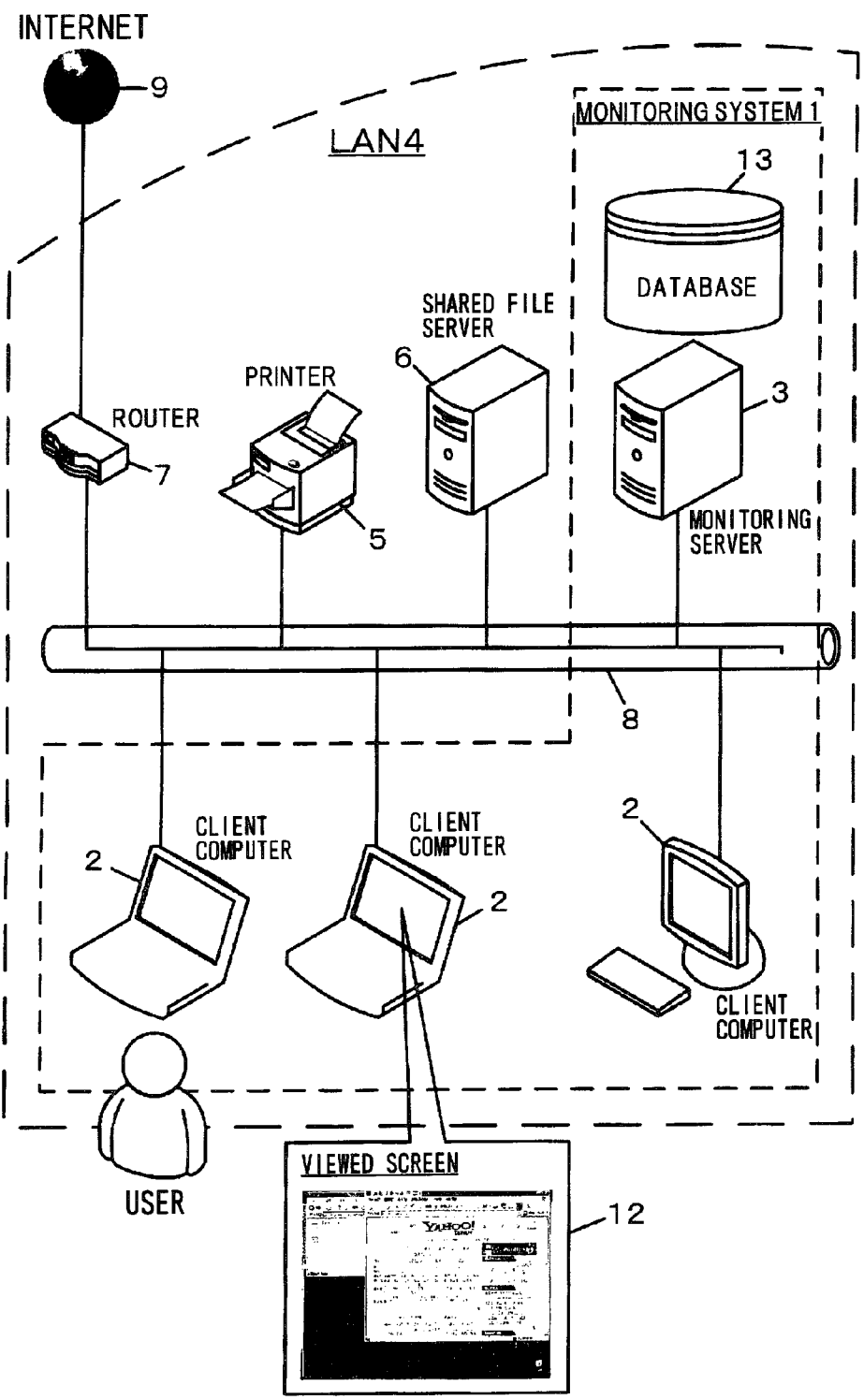
FIG. 1 is a diagram schematically showing a monitoring system 1 of the present invention.

The best mode for carrying out the invention will be hereinafter described. FIG. 1 schematically shows a monitoring system 1 of the present invention. The monitoring system 1 constitutes a system for monitoring the usage state of a client computer 2. The monitoring system 1 is configured from the client computer 2 and a monitoring server 3. The client computer 2 constitutes a common computer comprising an input/output apparatus. The client computer 2 and the monitoring server 3 are connected to a LAN 4.

The client computer 2 is connected by the LAN 4 with another client computer 2 or a printer 5 or the like. In addition, a shared file server 6 in which files or the like for shared use are stored is connected to the LAN 4. The client computer 2 can access the shared file server 6 via the LAN 4, and can access shared files stored in the shared file server 6.

Furthermore, the LAN 4 is connected to an external network such as the Internet 9 by way of a router 7 connected thereto. The LAN 4 provides the connection between computers such as the client computer 2, the monitoring server 3, the shared file server 6, the router 7 and the printer 5 from which it is configured by way of a LAN cable 8. The user is able to perform required tasks using the client computer 2 employing software installed in the client computer 2.

In addition, the user can access other client computers 2 or the shared file server 6 or the like from the client computer 2, and can use the printer 5 to print hard-copy documents. In addition, the user can access the Internet 9 by way of a web browser installed in a client computer 2 to view data on the Internet 9, to download files, and to perform the transmission and reception of electronic mail using electronic mail software.

Figure 2:
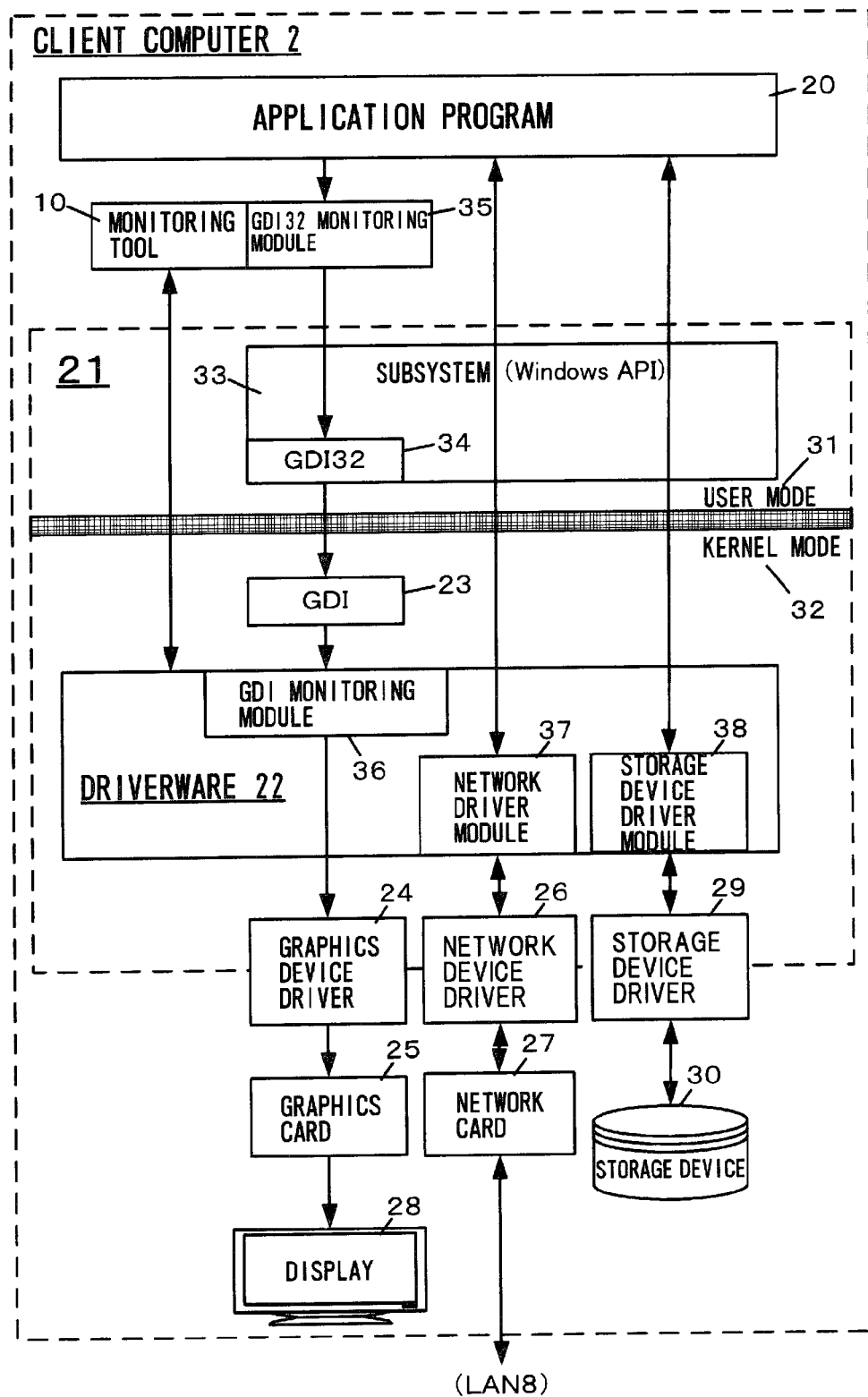
FIG. 2 is a diagram schematically showing a client computer 2.

A monitoring tool 10 is installed in the client computer 2 (see FIG. 2). The monitoring tool 10 constitutes software for sending contents displayed on the screen of the client computer 2 to the monitoring server 3. The monitoring tool 10 comprises a function for acquiring a screen image display on a screen of a client computer 2 and text data contained in this screen image, and sending this to the monitoring server 3. The screen image is stored on the basis of a draw command when the screen image is created.

When the screen image contains raster data such as RAW bit map data or the like, the monitoring tool 10 sends this to the monitoring server 3 together with the text data and the draw command. A reduction in send data can be achieved by compressing the raster data contained in the screen image. Furthermore, the screen image and text data can be encryptedly sent to the monitoring server 3. This compression and encryption is performed employing well-known techniques. Accordingly, a detailed description thereof has been omitted.

Figure 4:
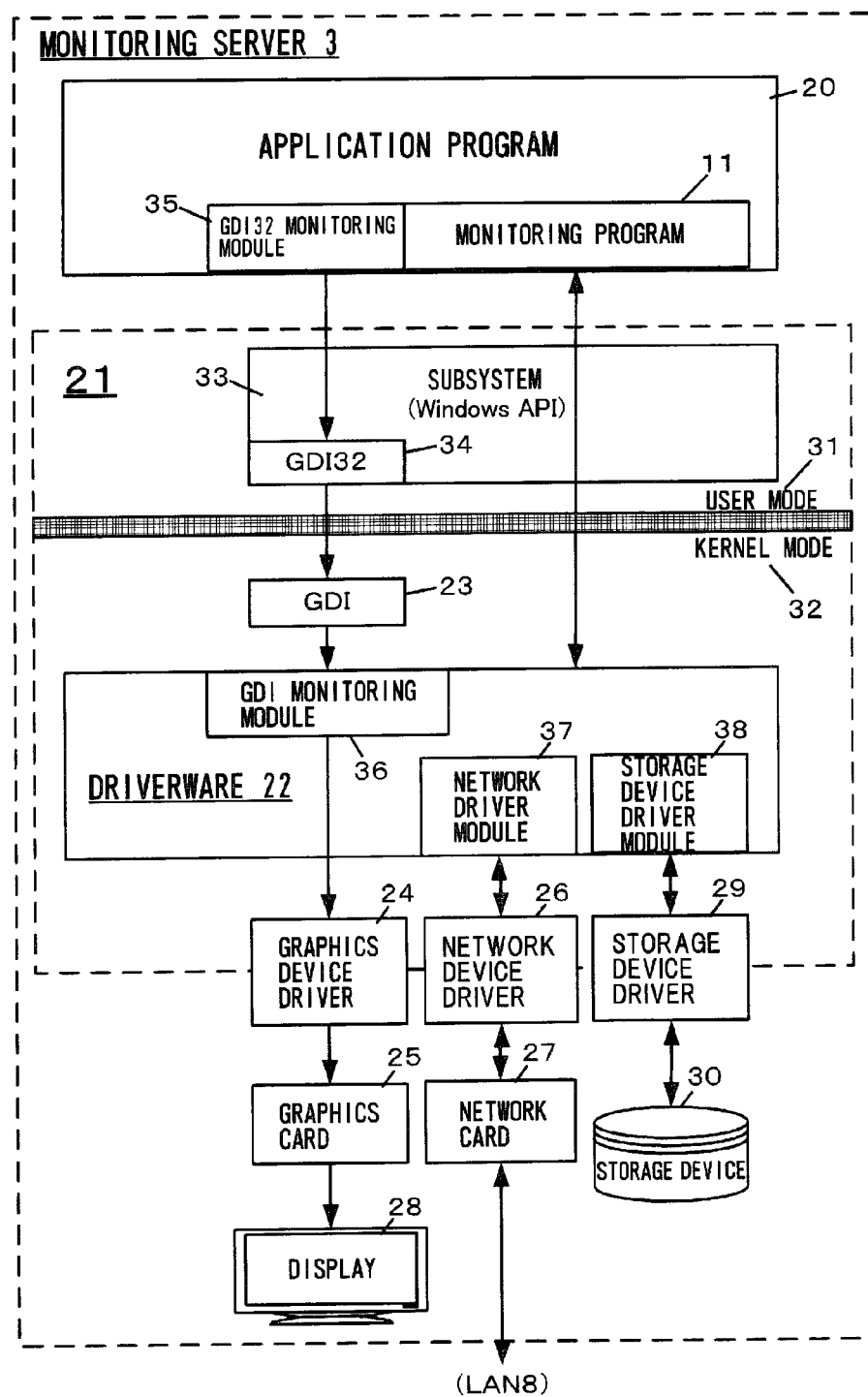
FIG. 4 is a diagram schematically showing a monitoring server 3.

A monitoring program 11 that constitutes a monitoring application program is installed in the monitoring server 3 and actuated thereby (see FIG. 4). The monitoring server 3 comprises an internal or externally-fitted storage device 30

(see FIG. 4) in which a database 13 (See FIG. 1) in which the required data for monitoring the client computer 2 is stored. The monitoring program 11 comprises a function for correlatively storing in the database 13 data necessary for reproducing a screen image from a screen command sent from the client computer 2 and text data extracted from a draw command.

While the monitoring tool 10 or a driverware 22 (described later) comprises a function for extracting text data from a draw command, the monitoring server 3 may also comprise this function. The monitoring tool 10 comprises a function for acquiring information related to the actuation of software such as an application program or the like actuated on the client computer 2 and sending this to the monitoring server 3. For example, the monitoring tool 10 acquires data and so on related to an operation log such as file opening/closing, updating and deletion and to execution of the application program 20, and sends this to the monitoring server 3. The monitoring tool 10 acquires data when the input/output apparatus of the client computer 2 is operated and sends this to the monitoring server 3.

FIG. 2 schematically shows the client computer 2. The application program 20, operating system 21, driverware 22, GDI23, graphics device driver 24, graphics card 25, network device driver 26, network card 27 and display 28 are shown in FIG. 2. A storage device driver 29 and storage device 30 are also shown in the diagram. The application program 20 constitutes software installed in the client computer 2.

The client computer 2 constitutes a common computer comprising an input/output apparatus such as the display 28, a mouse (not shown in the diagram) and a keyboard (not shown in the diagram), a storage device 30 such as an internal or externally-fitted hard disk, a memory such as a RAM (not shown in the diagram) and a ROM (not shown in the diagram), and a central processing unit (not shown in the diagram). The client computer 2 also comprises hardware necessary for data communication such as the network card 27 and a communication port (not shown in the diagram).

In addition, the application program 20 constitutes a program actuated by a Windows (Trademark name) user mode 31. The operating system 21 constitutes basic software introduced and installed in the client computer 2. The display 28 constitutes one physical device of an output apparatus of the client computer 2. The network card 27 constitutes a physical device by which the client computer 2 is connected to a network.

The network device driver 26 constitutes a program for directly controlling the network card 27, and providing communication between the operating system 21 or application program 20 and the LAN 8. A large number of physical devices such as the network card 27 and the display 28 are loaded in the client computer 2.

These physical devices are controllably actuated by respective device drivers such as the network device driver 26. These device drivers are controlled through the operating system 21. The transmission and reception of data from one database to another database is normally performed by way of the operating system 21, or more particularly a user mode 31 of the operating system 21.

The driverware 22 constitutes software for actualizing data transmission and reception with device drivers in a kernel mode 32. An example driverware 22 as disclosed in WO02/091195 constitutes a computer interface driver program. The driverware 22 comprises a function for providing transmission and reception of data between not only device drivers but also between the operating system 21 and a plurality of device drivers.

The driverware 22 is actuated in a kernel mode 32 of the operating system 21, and this data is acquired when data is transmitted and received from the GDI32 (34) of the operating system 21 to the GDI23. In addition, the driverware 22 acquires this data when data is transmitted and received from the GDI23 to the graphics device driver 24.

The graphics card 25 constitutes a physical device for producing a screen image display on the display 28. The graphics device driver 24 constitutes a device driver for controlling the graphics card 25. The graphics device driver 24 generates a screen image while controlling the graphics card 25 in accordance with data transferred together with a command from the GDI23 (see description provided later).

The graphics card 25 stores the contents of a bitmap format RAW data for display on the display 28 in a memory, successively sends this to the display 28 in accordance with a graphics device driver 24 command, and displays a screen image on the display 28. The monitoring tool 10 constitutes a program installed in the client computer 2 for acquiring data such as a screen image displayed in the display 28 of the client computer 2 and sending this to the monitoring server 3.

The monitoring tool 10 acquires a draw command from a GDI32 monitoring module 35. More particularly, the GDI32 monitoring module 35 receives data and a screen display request draw command transferred from the application program 20 to the GDI32 (35), and transfers this received data to the monitoring tool 10. The draw command constitutes a GDI function for outputting vector data, raster data and text data to a display apparatus.

The driverware 22 comprises a GDI monitoring module for providing an interface with a GDI23, a network driver module 37 for providing an interface with the network device driver 26, and a storage device driver module 38 for providing an interface with the storage device driver 29.

[Regarding the GDI]

In Windows, all data displayed on the display 28 including the windows and text are handled as images. In standard Windows, a plurality of subsystems 33 including a graphics-related subsystem GDI32 (Graphics Device Interface 32) (34) are provided. Windows uses a GDI32 (34) when data such as text, diagrams, image data and so on are displayed on a printing apparatus or display apparatus such the display 28. The GDI32 (34) is actuated by a user mode 31 of an operating system 21.

The application program 20 requests the subsystem 33 to perform processing such as screen image drawing or printing, this processing being then performed by the GDI32 (34) of the subsystem 33. Together with the GDI23 actuated by the kernel mode 32, the GDI32 (34) converts and executes this request to a format that can be processed by a display driver or a printer driver. The GDI23 absorbs the differences according to the kind or type of output apparatus through an exchange carried out with the device driver whereupon, accordingly, the application program 20 can be actuated irrespective of the type of output apparatus.

The GDI23 provides the following draw commands for processing request data from the application program 20. For example, a draw command that outputs a vector data such as a DrvLineTo command for drawing lines. In addition, a draw command such as a DrvTextOut command for outputting a text character string. In addition, a draw command such as a DrvVitBlt command for outputting raster data.

Text output can be performed using the following GDI functions:

```
BOOL
DrvTextOut (
    IN SURFOBJ *pso,
    IN STROBJ *pstro,
    IN FONTOBJ *pfo,
    IN CLIPOBJ *pco,
    IN RECTL *prclExtra,
    IN RECTL *prclOpaque,
    IN BRUSHOBJ *pboFore,
    IN BRUSHOBJ *pboOpaque,
    IN POINTL *pptlOrg,
    IN MIX mix
);
```

The driverware 22 provides an interface between the GDI23 and the application program 20 or the operating system 21, and acquires commands and data sent from the GDI23 and application program 20 or operating system 21 to the GDI23. The driverware 22 acquires a draw command from the GDI23 and the application program 20 or operating system 21 and sends this to the GDI23 in order to create a screen image.

The driverware 22 comprises a function for extracting text data from a draw command, and a function for sending a draw command and text data to the monitoring server 3. This is sent to the designated monitoring server 3 in accordance with a command from the monitoring tool 10.

[Drawing Steps]

Figure 3:
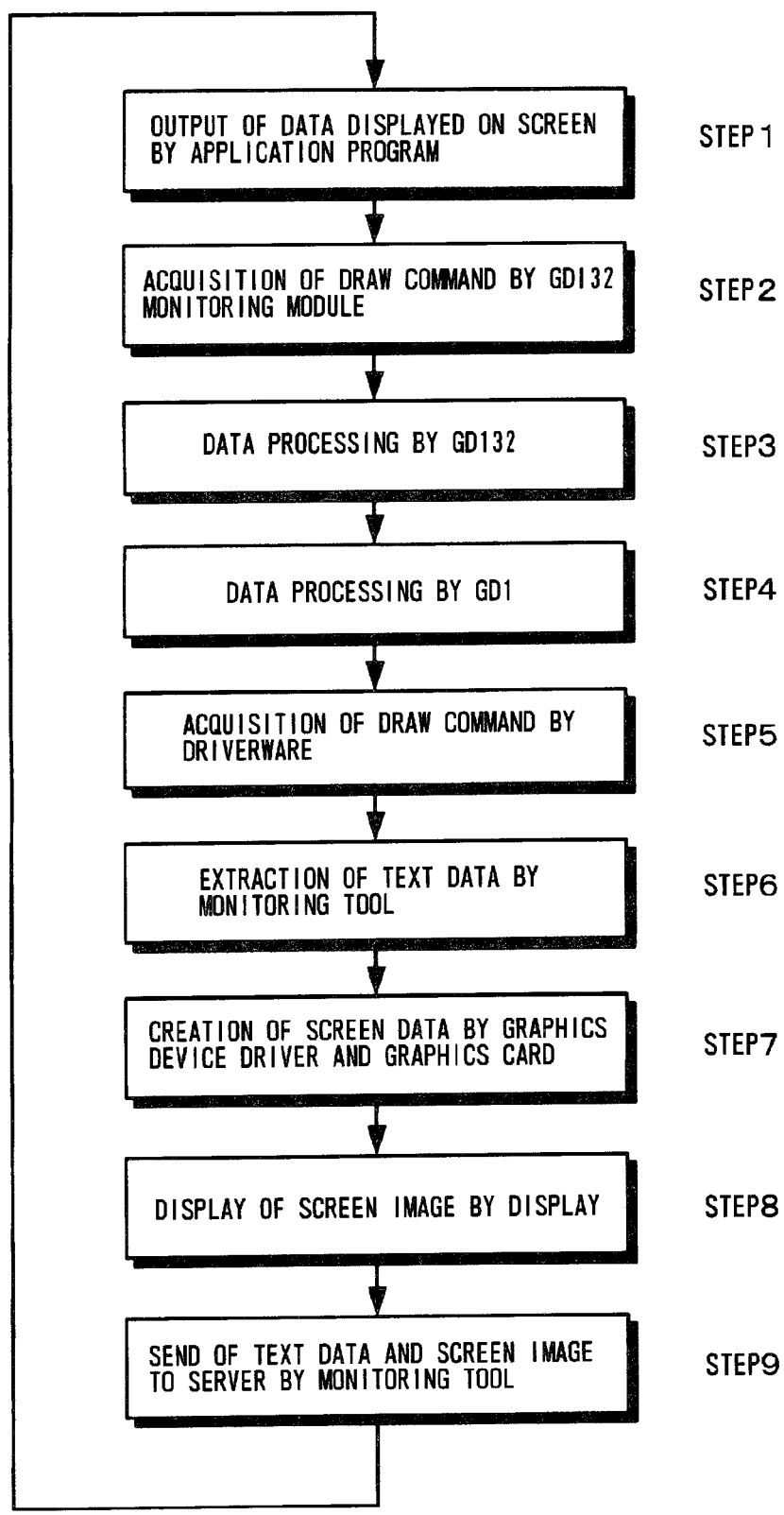
FIG. 3 is a flow chart showing steps for displaying a screen image on a display 28.

FIG. 3 is a flow chart of the steps for displaying a screen image. When text or a diagram is to be displayed on a display 28, the application program 20 outputs the text or diagram to the GDI32 (34) and issues a display request thereto (Step 1). The request to the GDI32(34) from the monitoring tool 10 is transferred from a subsystem 34 to the GDI123 (Step 3). The GDI32 monitoring module 35 acquires this request at this time (Step 2).

Upon receipt thereof, the GDI23 converts the request into a format that can be processed by the graphics device driver 24, and sends this to the graphics device driver 24 (Step 4). The driverware 22 acquires the data sent from the GDI 23 to the graphics device driver 24 by means of the GDI monitoring module 36, and sends this to the monitoring tool 10 (Step 5).

A screen image is acquired on the basis of draw command when the screen image is generated. In addition, a screen image is acquired and stored as raster data when created by a client computer.

The monitoring tool 10 analyzes the GDI32 monitoring module 35 and the draw command for generating the screen image acquired from the driverware 22 to acquire the text data contained therein (Step 6). The graphics device driver 24 and graphics card 25 employ the data received from the GDI23 to generate a screen image (Step 7).

The graphics card 25 sends the created screen image to the display 28 for display thereon (Step 8). The monitoring tool 10 transfers the acquired text data and screen image to the driverware 22, and the driverware 22 employs the text data and screen image to produce send data for transmission to the monitoring server 3. The created send data is transferred to the network device driver 26, and is sent to the monitoring server 3 by way of the network card 27 (Step 9).

The monitoring tool 10 acquires, in addition to the draw command and the text data contained therein, screen image-created time information, identification information of a client computer 2, and identification information of a user of the monitoring server 3. As identification information of the client computer 2, at least one of the computer name, an IP address, and a MAC address of the client computer 2 are acquired. As identification information of the user, the user name logged-in to the client computer 2 is acquired.

FIG. 4 schematically shows a monitoring server 3. The monitoring server 3 constitutes a normal computer comprising an input/output apparatus such as a display 28, mouse (not shown in the diagram) and keyboard (not shown in the diagram), a storage device 30 such as an internal or externally-fitted hardware, a memory such as a RAM (not shown in the diagram) and ROM (not shown in the diagram), and a central processing unit (not shown in the diagram). The monitoring server 3 also comprises hardware necessary for data communication such as a network card 27 and a communication port (not shown in the diagram).

The monitoring server 3 comprises a storage device 30 and a storage device driver 29. The storage device 30 constitutes an internal storage device of the monitoring server 3 and serves as a storage device for storing a database 13. The storage device driver 29 constitutes a device driver for directly controlling the storage device 30. The remaining devices and software of the monitoring system 1 are identical to those shown in FIG. 2 and, accordingly, a detailed description thereof has been omitted. Only the actuation of the different functions will be hereinafter described.

[Overall Operation]

Figure 5:
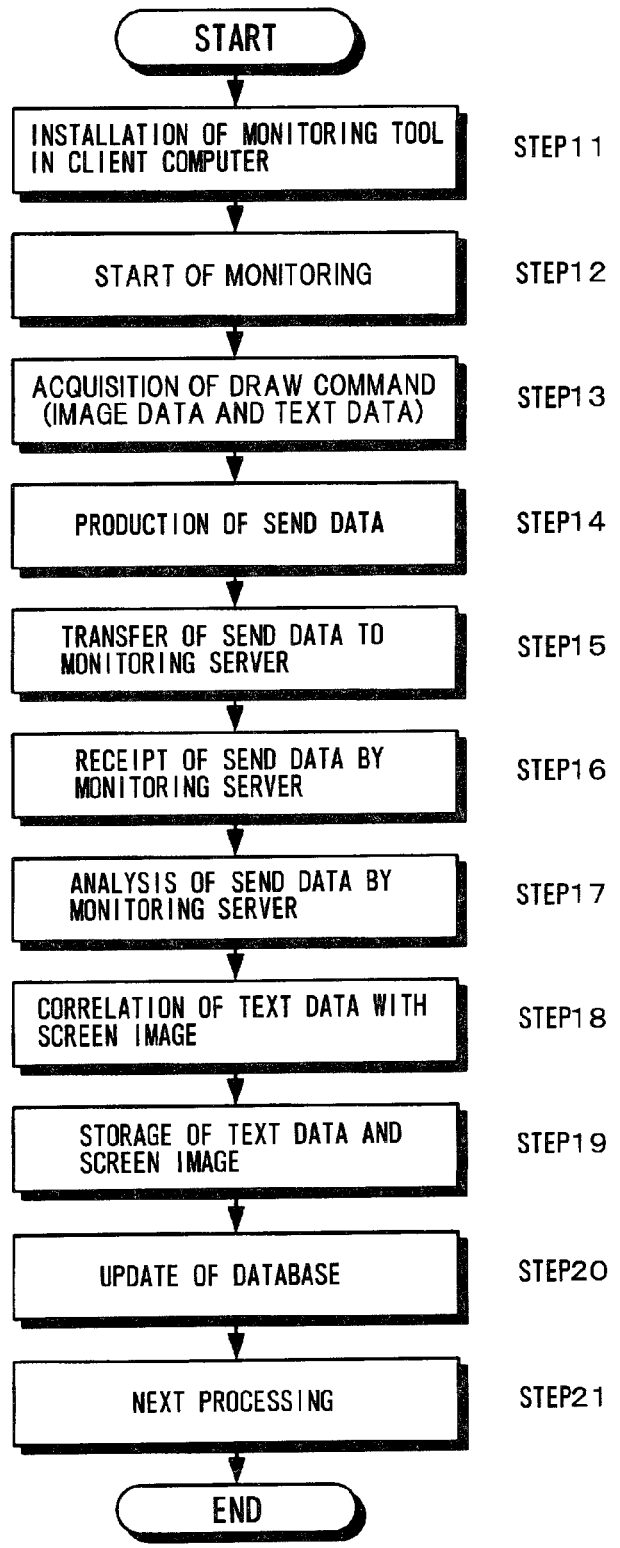
FIG. 5 is a flow chart showing the overall operation flow of the monitoring system 1.

FIG. 5 shows a flow chart of the overall operation of the monitoring system 1. A monitoring tool 10 is pre-installed (Step 11) in a client computer 2 for which the usage state thereof is to be monitored. The monitoring tool 10 is stored in a storage medium such as a CD-ROM or flexible disk and installed in the client computer 2 by way of this storage medium. In addition, it may be installed in the client computer 2 by downloading from a network.

The driverware 22 is simultaneously installed therewith at this time. The monitoring tool 10 is actuated on the client computer 2 to designate the monitoring server 3 and, in turn, to start user monitoring (Step 12). In addition, a log monitoring related to files of the actuation of a application program 20 actuated on the client computer 2 can be designated.

Thereafter, the monitoring tool 10 uses an input/output function of the GDI 23 to acquire a draw command for a screen image displayed on a display 28 of a client computer 2 and text data contained in the draw command (Step 13). This data acquisition will be described in detail with reference to the flow chart of FIG. 3. In addition, the monitoring tool 10 acquires a screen image that is sendable to the display 28, and produces send data containing text data and screen images and the like and sends this to the monitoring server 3 (Steps 14, 15).

While the screen image is fundamentally an image command-based image, it may also be expressed as raster data. In this case, the screen image can be compressed and the size thereof altered. In addition, the data sent to the monitoring server 3 can be encrypted. The monitoring server 3 receives the send data containing the text data and screen image and the like sent from the client computer 2 and performs an analysis thereof (Steps 16, 17).

The monitoring server 3 stores the correlated text data and screen images in a storage device (Steps 18, 19). The database 13 is updated by the text data and screen image data (Step 20). Screen image-created time information, identification information of the client computer 2 and identification information of the user and so on sent from the client computer 2 are additionally stored in the database 13.

The monitoring server 3 shifts to the following processing. The processing from Steps 16 to 19 performed by the monitoring server 3 are performed by the monitoring program 11. All designated client computers 2 in which the monitoring tool 10 is installed perform this processing. The usage state of a client computer 2 can be ascertained in accordance with data stored in the database 13.

Figure 6:
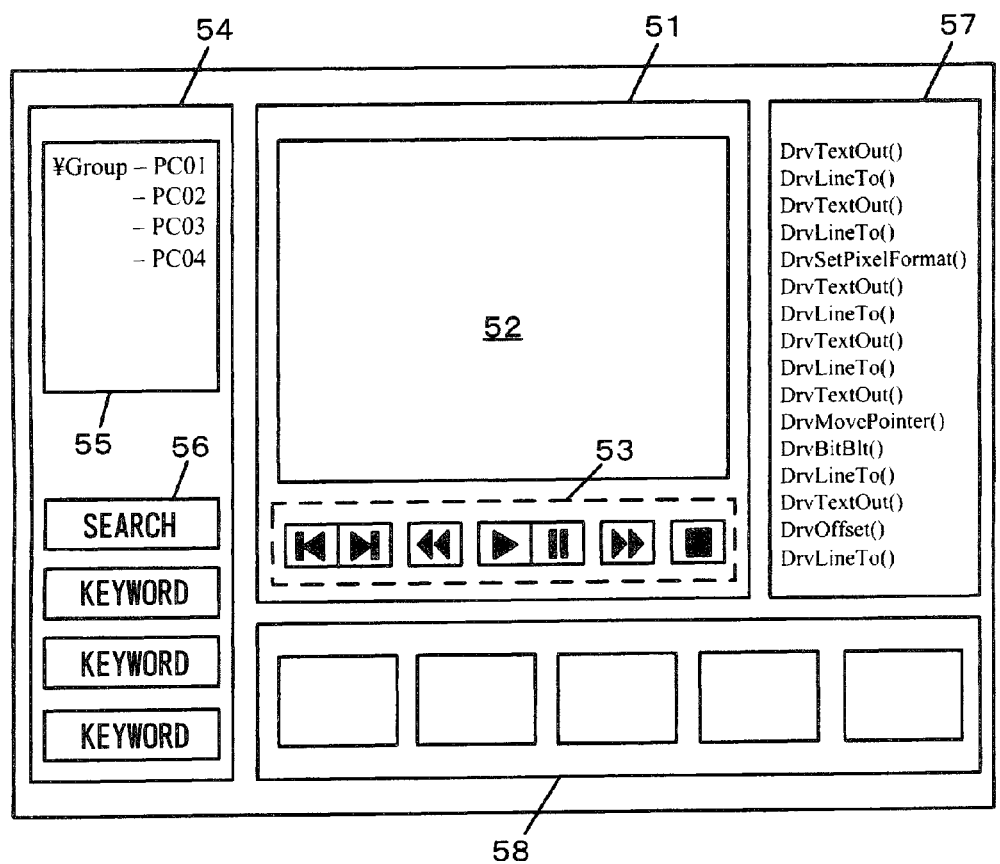
FIG. 6 is an example of a screen when data stored in a database 13 is searched and a screen image of a client computer 2 is reproduced.

The data stored in the database 13 is searched, and the usage state of a client computer 2 is ascertained while a screen image correspondent thereto is being reproduced. FIG. 6 shows an example of a screen when contents of a database 13 are searched to reproduce a screen. A reproduction region 51 for reproducing the usage state of a client computer 2 is displayed near the center of the screen of FIG. 6.

A reproduction screen 52 that constitutes a region for displaying a reproduction screen image of a client computer 2 and a reproducing toolbar 53 configured from buttons for executing control during reproducing are provided in the reproducing region 51. Various buttons for continuously reproducing and controlling an image displayed on the reproducing screen 52 are provided in the reproducing toolbar 53. The buttons and so on displayed from the left in the reproducing toolbar 53 are a frame reverse, frame forward, rewind, playback, pause, fast-forward and a stop button.

A search region 54 is displayed in the left side of the reproducing region 51. A terminal list region 55 and search region 56 are displayed in the search region 54. A list of monitored client computers 2 or a list of client computers 2 in which display screens for monitoring are stored are displayed in the terminal list region 55. An input box or the like for a search keyword is displayed in the search region 56.

A terminal operation history menu 57 for displaying a list of draw commands for images displayed on the reproducing screen 52 is displayed in the right side of the reproducing region 51. A thumbnail region 58 is displayed in the lower side of the reproducing region 51. An image thumbnail correspondent to a search result obtained by keyword input in the search region 56 is displayed in a thumbnail region 58.

Figure 7:
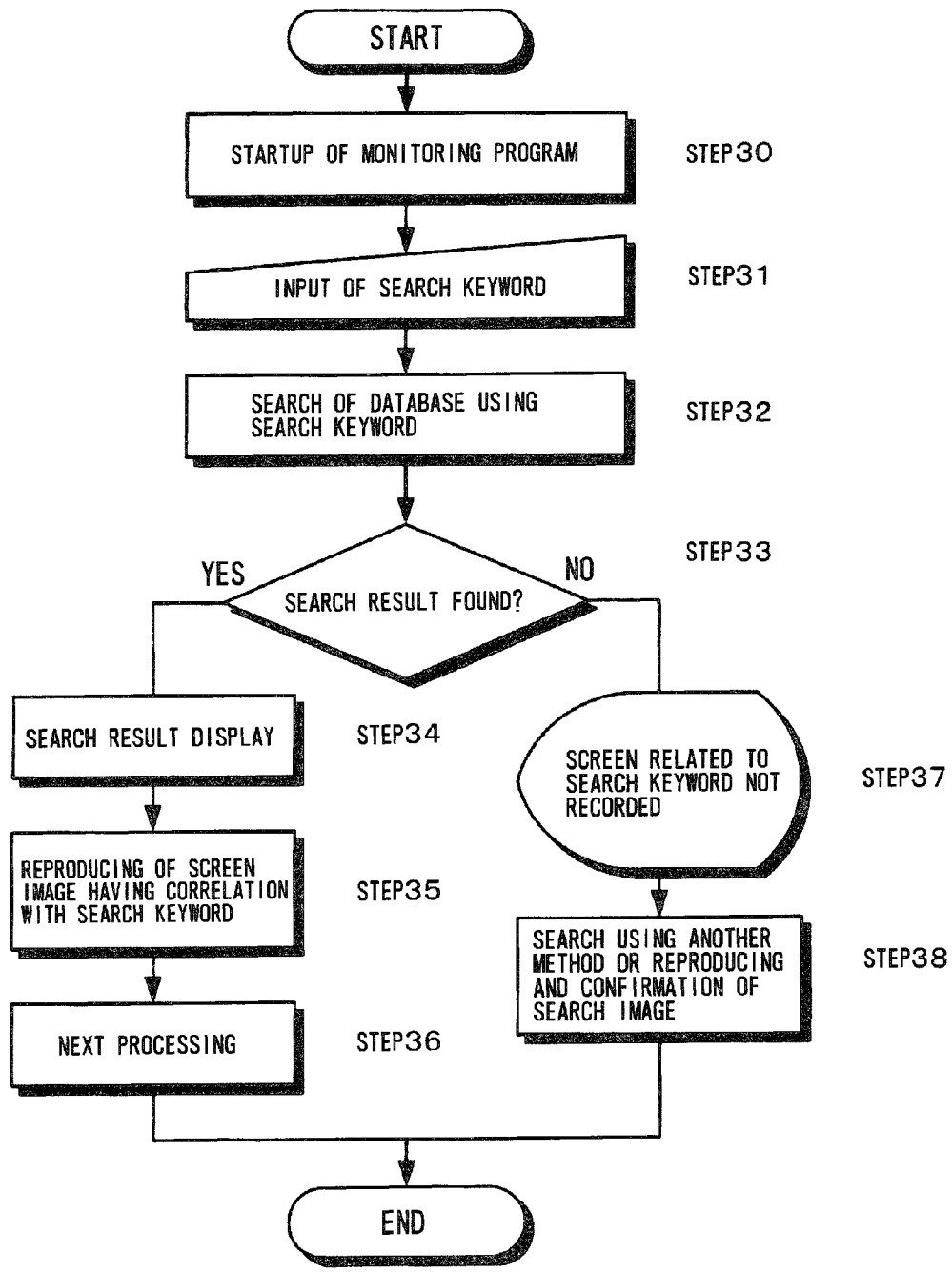
FIG. 7 is a flow chart showing the flow for ascertaining the usage state of the client computer 2 in accordance with data stored in the database 13.

The flow chart of FIG. 7 shows an example of a usage state of a client computer 2 ascertained by search of data stored in a database 13 while a screen image correspondent thereto is being reproduced. The monitoring program 11 is started (Step 30), and a screen as shown in FIG. 6 is displayed. A search keyword is input into the search region 54 (Step 31). A specified program name, input word, operating time, operating time period, IP address, user name or access destination IP address or the like can be designated as a search keyword.

In addition, identification information of a client computer 2 and identification information of a user can be specified. The contents of the database are searched using a search keyword (Step 32). The search result is displayed in the thumbnail region 58 (Steps 33, 34). If there is a plurality of search results, these are displayed alongside each other. When a search is to be performed, a specific client computer 2 can be selected from the terminal list region 55.

When a single thumbnail is selected from a search result of the thumbnail region 58, a screen image having correlation with this result is called up from the storage device 30 and displayed and reproduced on the reproducing screen 52 (Step 35). The screen image is stored on the basis of a draw command and, accordingly, the screen image is repeatedly and continuously reproduced by the draw command. A list of draw commands used by the screen image is displayed in the terminal operation history menu 57. The operation history of the client computer 2 is also displayed in the terminal operation history menu 57.

More specifically, information and so on related to the file access history and the execution of an application program is displayed in the terminal operation history menu 57, and operations related to a screen image prior and subsequent to a screen image are ascertained. A usage state of a client computer 2 is confirmed while reproducing and fast-forwarding a reproducing screen using the reproducing toolbar 53. When there is no matching search result to the keyword, notification to that effect is provided so that the search can be continued using another method (Steps 33, 37, 38). For example, the usage state of a client computer 2 is confirmed by reproducing of a screen recorded in a predetermined time period and a search conducted using a similar keyword.

When the screen image of the client computer 2 alone is not stored and text data contained in the screen image having correlation therewith is stored in this way, this is searchable thereafter by input of a normal text keyword. Accordingly, the manner in which a user is using a client computer 2 can be quickly ascertained. Because the screen image is stored on the basis of a draw command, the volume of data handled is significantly less than in the case of image data.

Naturally, whether a user is performing an improper operation such the illegal copy of copyrighted electronic data or is accessing inappropriate web pages can be confirmed and easily ascertained. More particularly, notification can be provided by chronological reproducing of the screen images recorded in the storage device 30.

In addition, the monitoring program 11 can be provided with a function for notifying a supervisor of when a specific keyword has been found which allows a an improper operation being performed by a user to be quickly dealt with. In addition, a warning can be displayed on the display 28 of the client computer 2, or a warning can be issued by notification via electronic mail to the user of the client computer 2. Notification to a supervisor is possible by a warning displayed on the supervisor's computer, a warning being sent to the supervisor's mobile telephone, or a warning being sent to the user's electronic mail address.

While the database 13 and screen image are stored in the monitoring server 3, they can also be stored in another computer on the network and in a local or externally-fitted recording apparatus of the client computer 2. With reduced storage volume in mind, the stored screen image may be a monochrome image. The database 13 can be accessed by way of a client computer 2, the monitoring server 3, or from another computer connected by way of a network and the contents recorded therein searched and the stored screen images reproduced.

In this embodiment, a monitoring tool 10 actuated on the client computer 2 and a monitoring program 11 actuated on the monitoring server 3 are provided. However, a management program of partially restricted monitoring program 11 functions can be provided. For example, a management program may comprise only a function for reproducing a stored screen image and a function for searching a database 3. This management program may be installed and operated in a computer able to access a stored screen image or a database 3 using a specialized application program. Furthermore, this manager program can be a web-base program.

[Reproducing of Screen Image in Kernel Mode 32]

Figure 8:
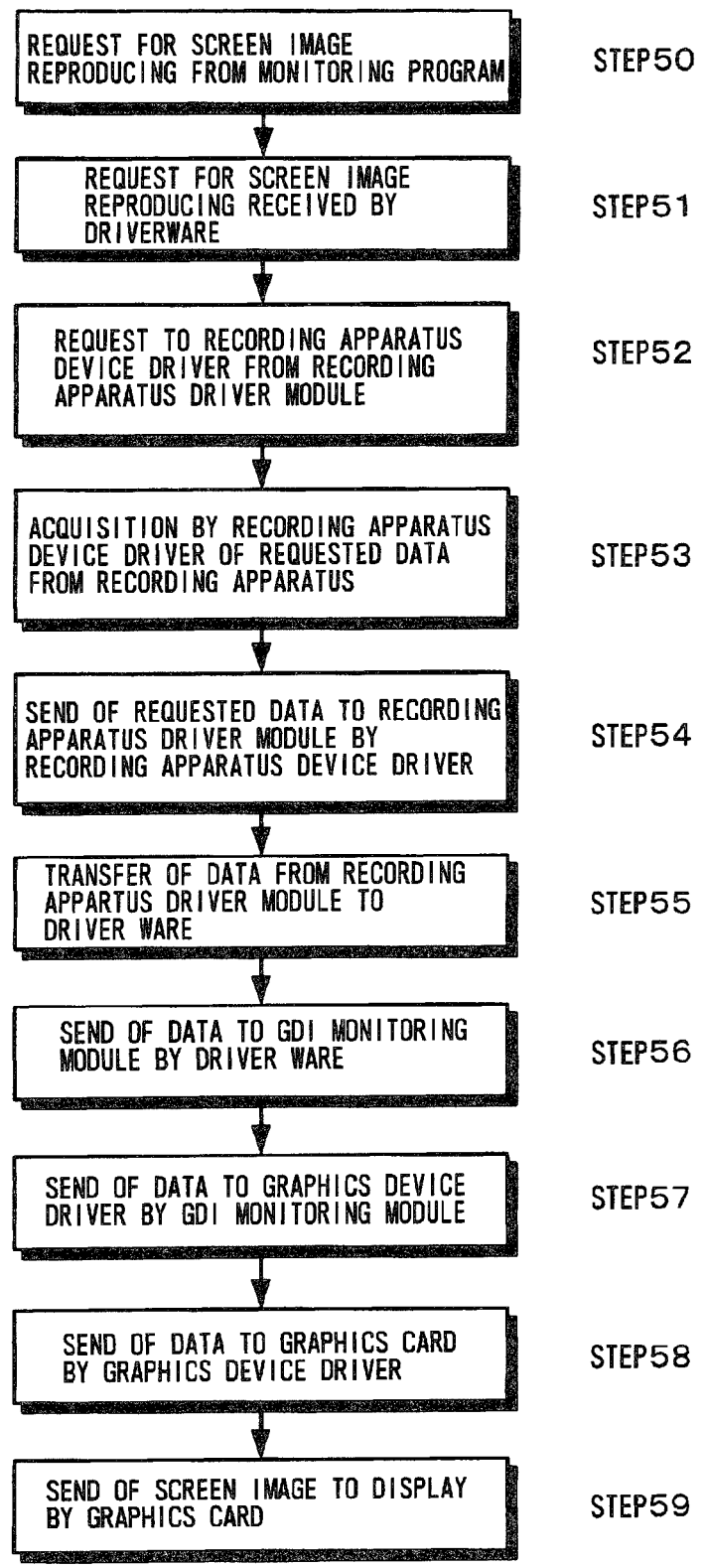
FIG. 8 is a flow chart showing an example of the reproduction of a screen image in a kernel mode 32.

A method of reproducing in a user mode 31 or kernel mode 32 is adopted by the monitoring server 3 when a screen image stored in the storage device 30 is reproduced. The flow chart of FIG. 8 shows a method for reproducing a screen image in a kernel mode 32. When a screen image is reproduced, a screen image data request is issued from the monitoring program 11 to the driverware 22 (Step 50).

The driverware 22 receives the screen image reproducing request (Step 51), and a request for data is issued from the storage device driver module 38 of the driverware 22 to the storage device driver 29 (Step 52). The storage device driver 29 acquires the requested data from the storage device 30 (Step 53) and sends this to the storage device driver module 38.

The storage device driver module 38 transfers the data received from the storage device driver 29 to the driverware 22. The driverware 22 sends this data by way of the GDI monitoring module 36 to the graphics device driver 24 (Step 56, 57). The graphics device driver 24 and graphics card 25 produce a screen image displayable on the display 28 from data received from the GDI monitoring module 36, and send this to the display 28 (Steps 58, 59).

Accordingly, screen images are reproduced from stored screen image data. Data acquired from the storage device 30 is sent and processed by way of the kernel mode 32 alone of the operating system 21 using this method and, accordingly, the need for the operating system 21 to be switched between the kernel mode 32 and the user mode 31 is eliminated, and the series of processings are performed at high speed.

[Screen Image Reproducing in the User Mode 32]

Figure 9:
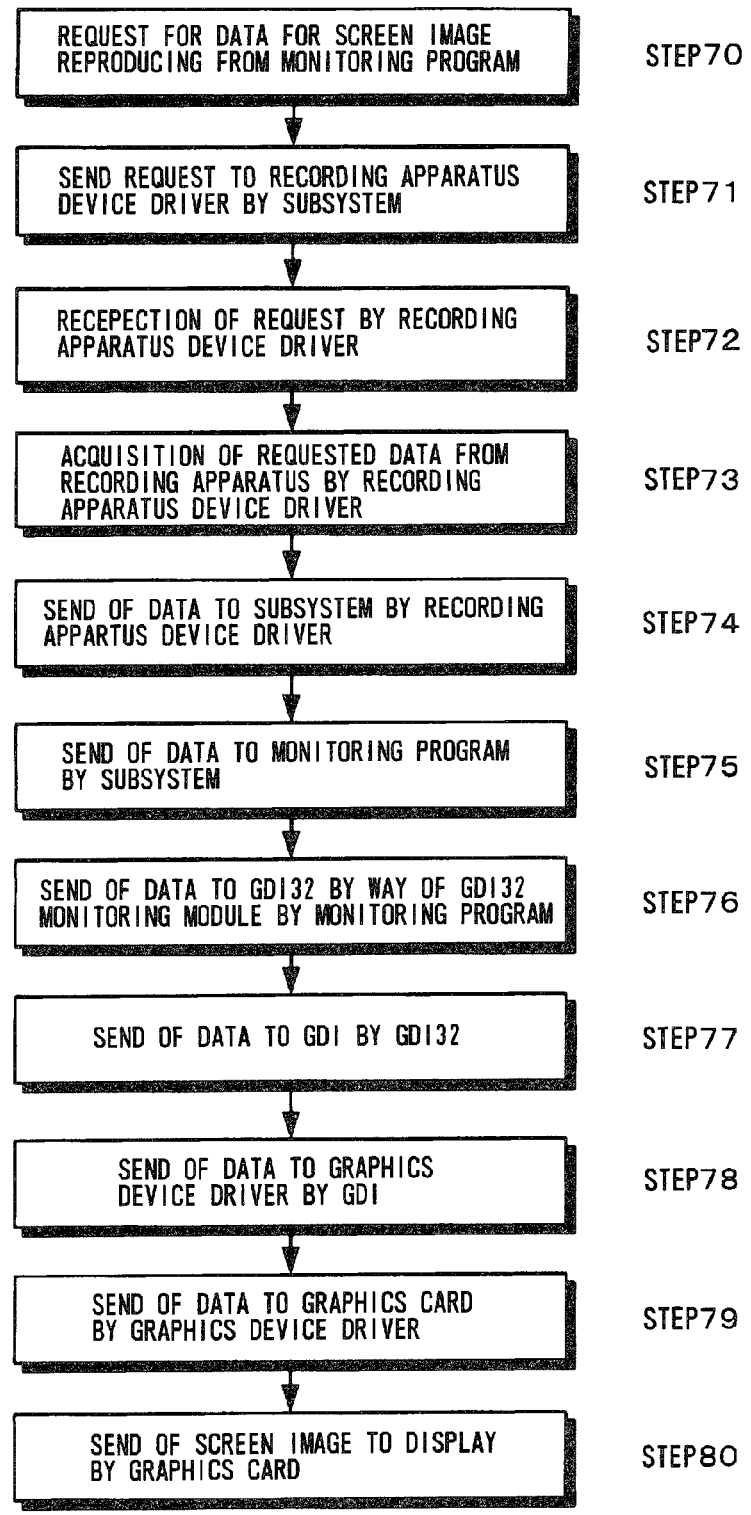
FIG. 9 is a flow chart showing an example of the reproduction of a screen image in a user mode 31.

The flow chart of FIG. 9 shows a method for reproducing a screen image in the user mode 31. A screen image data (screen reproducing data) request is issued from the monitoring program 11 to the storage device 30 (Step 70). This request is sent to the storage device driver 29 by way of the subsystem 33 (Step 71).

When screen reproducing data from the monitoring program 11 to the storage device driver 29 is requested, the actuated mode of the operating system 21 is switched from the user mode 31 to the kernel mode 32. The storage device driver 29 receives this request (Step 72), acquires the requested screen reproducing data from the storage device 30 (Step 73), and transfers this by way of the storage device driver 29 to the monitoring program 11 (Steps 74, 75).

When the requested screen reproducing data is transferred from the storage device driver 29 to the monitoring program 11, the actuated mode of the operating system 21 switches from the kernel mode 32 to the user mode 31. While the request for screen reproducing data from the monitoring program 11 to the storage device driver 29 and the transfer of screen reproducing data from the storage device driver 29 to the monitoring program 11 is performed by way of the driverware 22, the driverware 22 does not perform any processing of any kind on this data.

The monitoring program 11 performs screen image reproducing employing screen reproducing data by way of the GDI32 monitoring module 35 (Step 76). The GDI32 monitoring module 35 transfers the screen image screen reproducing data transferred from the monitoring program to the GDI32(34), and this is transferred from the GDI32(34) to the GDI23 (Steps 76, 77). At this time, the actuated mode of the operating system 21 is switched from the user mode 31 to the kernel mode 32.

The GDI23 transfers the screen image data to the graphics device driver 24 (Step 78). The graphics device driver 24 and the graphics card 25 produce a screen image displayable on the display 28 from the data received from the GDI monitoring module 36, and send this to the display 28 (Steps 79, 80).

Accordingly, a screen image is reproduced from screen image screen reproducing data stored in the storage device 30. Using this method, data acquired from the storage device 30 is processed while the operating system 21 is being switched between the kernel mode 32 and the user mode 31. For this reason, the series of processings speeds is slower than when a screen image is reproduced in a kernel mode 32 along (see the flow chart of FIG. 8).

In this way, the monitoring system 1 stores records of all operations performed by a user on a client computer 2 from when the user logs in until when the user logs off, whereby the client computer 2 is monitored. A supervisor is able to periodically confirm and monitor the usage state of a client computer 2 from the stored screen images and text data. For example, a specific time band can be specified to search for stored screen images or text data and confirm the usage state of a client computer 2. In addition, the usage state of a client computer 2 can be randomly confirmed several times each day. The monitoring system 1 comprises a report function for periodically reporting the usage state of a client computer 2.

The report function can be actualized using a specialized software. FIG. 10 shows an example of a report. The report 70 shown in FIG. 10 constitutes a report produced subsequent to an improper operation being performed by a user using a client computer 2. The report 70 illustrates reports 71 to 73 of three computers. The reports 71 to 73 list the items "computer" for indicating the client computer 2, "user name" for indicating the user of the client computer 2, "log-in time" for indicating the log-in time of the user, "log-off time" for indicating the log-off time of the user, and the "number of improper operations" indicating whether or not a user has performed an improper action.

Improper operations include the following operations and accesses. The execution of improper programs such as computer viruses or programs used for hacking and cracking. Operations performed by a user to access a network address that generates inappropriate information. In addition, access that is in breach of the regulations of the organization or the like to which the monitoring system 1 has been introduced, actions involving downloading of information that constitute an infringement of copyright and accessing such sites. In addition, network addresses such as the IP addresses thereof come under the heading of improper operations.

When an improper operation has occurred as shown in, for example, the report 71, items such as the "access IP" that indicates the accessed IP address thereof and the "access time band" that indicates the accessed time band are tracked. Based on this report 70, a supervisor can perform a monitoring while a screen image in which the usage state generated by the user has been stored is being reproduced. Furthermore, further tracking of result of the report 70 is possible by analysis of the data used by the client computer 2 from various angles and viewpoints.

For example, a report can be compiled on the basis of an analysis of user, client computer, access address, used programs, warnings and text data keywords and the like. A stored screen image, text data or report 70 may be retained for a predetermined time period in accordance with a supervisory policy and, accordingly, they can be used by an auditing agency or security management or the like.

The present invention can have application in medical systems and medical equipment including large-scale apparatuses such as an MRI device, electronic patient chart system, electrocardiogram monitoring device, and medication monitoring device used in medical institutions. More particularly, provided the operating system used is Windows is used, the monitoring system 1 of the present invention can be introduced into all medical equipment or medical systems, and the history of these medical equipment or medical systems can be retained. Accordingly, medical records written by hand in a patient's chart and remote maintenance records can be markedly improved, and online monitoring thereof using a search function is possible.

In addition, the monitoring system 1 of the present invention can be introduced into a terminal that performs a remote maintenance such as a server in which data containing confidential information is stored. As a result of this system being introduced, the remote maintenance task history can be acquired. Accordingly, whether an irregular operation has been performed can be monitored at the terminal or server used to perform a remote maintenance, and this can be used as evidence of task history when an audit is carried out.

INDUSTRIAL APPLICABILITY

The present invention is suitable for use in fields that necessitate the tight security of electronic data. More particularly, the present invention may be used in financial institutions, atomic power-related facilities, for monitoring of equipment in medical institutions, and in fields where a terminal or the like is used to perform remote maintenance or to handle individual data. Furthermore, the present invention is suitable for use in an ISMS (Information Security Management System).

FIG. 1
INTERNET 9
MONITORING SYSTEM 1
DATABASE 13
ROUTER 7
PRINTER 5
SHARED FILE SERVER 6
MONITORING SERVER 3
CLIENT COMPUTER 2
CLIENT COMPUTER 2
CLIENT COMPUTER 2
USER
VIEWED SCREEN 12
  FIG. 2
CLIENT COMPUTER 2
APPLICATION PROGRAM 20
MONITORING TOOL 10
GDI32 MONITORING MODULE 35
SUBSYSTEM (Windows API) 33
USER MODE 31
KERNEL MODE 32
GDI MONITORING MODULE 36
DRIVERWARE 22
NETWORK DRIVER MODULE 37
STORAGE DEVICE DRIVER MODULE 38
GRAPHICS DEVICE DRIVER 24
NETWORK DEVICE DRIVER 26
STORAGE DEVICE DRIVER 29
GRAPHICS CARD 25
NETWORK CARD 27
STORAGE DEVICE 30
DISPLAY 28
  FIG. 3
STEP 1 OUTPUT OF DATA DISPLAYED ON SCREEN BY APPLICATION PROGRAM
STEP 2 ACQUISITION OF DRAW COMMAND BY GDI32 MONITORING MODULE
STEP 3 DATA PROCESSING BY GDI32
STEP 4 DATA PROCESSING BY GDI
STEP 5 ACQUISITION OF DRAW COMMAND BY DRIVERWARE
STEP 6 EXTRACTION OF TEXT DATA BY MONITORING TOOL
STEP 7 CREATION OF SCREEN DATA BY GRAPHICS DEVICE DRIVER AND GRAPHICS CARD
STEP 8 DISPLAY OF SCREEN IMAGE BY DISPLAY
STEP 9 SEND OF TEXT DATA AND SCREEN IMAGE TO SERVER BY MONITORING TOOL
  FIG. 4
MONITORING SERVER 3
APPLICATION PROGRAM 20
MONITORING PROGRAM 11
GDI32 MONITORING MODULE 35
SUBSYSTEM (Windows API) 33
USER MODE 31
KERNEL MODE 32
GDI MONITORING MODULE 36
DRIVERWARE 22
NETWORK DRIVER MODULE 37
STORAGE DEVICE DRIVER MODULE 38
GRAPHICS DEVICE DRIVER 24
NETWORK DEVICE DRIVER 26
STORAGE DEVICE DRIVER 29
GRAPHICS CARD 25
NETWORK CARD 27
STORAGE DEVICE 30
DISPLAY 28
  FIG. 5
START
STEP 11 INSTALLATION OF MONITORING TOOL IN CLIENT COMPUTER
STEP 12 START OF MONITORING
STEP 13 ACQUISITION OF DRAW COMMAND (IMAGE DATA AND TEXT DATA)
STEP 14 PRODUCTION OF SEND DATA
STEP 15 TRANSFER OF SEND DATA TO MONITORING SERVER
STEP 16 RECEIPT OF SEND DATA BY MONITORING SERVER
STEP 17 ANALYSIS OF SEND DATA BY MONITORING SERVER
STEP 18 CORRELATION OF TEXT DATA WITH SCREEN IMAGE
STEP 19 STORAGE OF TEXT DATA AND SCREEN IMAGE
STEP 20 UPDATE OF DATABASE
STEP 21 NEXT PROCESSING
END
  FIG. 6
SEARCH 56
KEYWORD
KEYWORD
KEYWORD
  FIG. 7
START
STEP 30 STARTUP OF MONITORING PROGRAM
STEP 31 INPUT OF SEARCH KEYWORD
STEP 32 SEARCH OF DATABASE USING SEARCH KEYWORD
STEP 33 SEARCH RESULT FOUND?
YES NO
STEP 34 SEARCH RESULT DISPLAY
STEP 35 REPRODUCING OF SCREEN IMAGE HAVING CORRELATION WITH SEARCH KEYWORD
STEP 36 NEXT PROCESSING
STEP 37 SCREEN RELATED TO SEARCH KEYWORD NOT RECORDED
STEP 38 SEARCH USING ANOTHER METHOD OR REPRODUCING AND CONFIRMATION OF SEARCH IMAGE END
 FIG. 8
STEP 50 REQUEST FOR SCREEN IMAGE REPRODUCING FROM MONITORING PROGRAM
STEP 51 REQUEST FOR SCREEN IMAGE REPRODUCING RECEIVED BY DRIVERWARE
STEP 52 REQUEST TO RECORDING APPARATUS DEVICE DRIVER FROM RECORDING APPARATUS DRIVER MODULE
STEP 53 ACQUISITION BY RECORDING APPARATUS DEVICE DRIVER OF REQUESTED DATA FROM RECORDING APPARATUS
STEP 54 SEND OF REQUESTED DATA TO RECORDING APPARATUS DRIVER MODULE BY RECORDING APPARATUS DEVICE DRIVER
STEP 55 TRANSFER OF DATA FROM RECORDING APPARATUS DRIVER MODULE TO DRIVER WARE
STEP 56 SEND OF DATA TO GDI MONITORING MODULE BY DRIVER WARE
STEP 57 SEND OF DATA TO GRAPHICS DEVICE DRIVER BY GDI MONITORING MODULE
STEP 58 SEND OF DATA TO GRAPHICS CARD BY GRAPHICS DEVICE DRIVER
STEP 59 SEND OF SCREEN IMAGE TO DISPLAY BY GRAPHICS CARD
 FIG. 9
STEP 70 REQUEST FOR DATA FOR SCREEN IMAGE REPRODUCING FROM MONITORING PROGRAM
STEP 71 SEND REQUEST TO RECORDING APPARATUS DEVICE DRIVER BY SUBSYSTEM
STEP 72 RECEPECTION OF REQUEST BY RECORDING APPARATUS DEVICE DRIVER
STEP 73 ACQUISITION OF REQUESTED DATA FROM RECORDING APPARATUS BY RECORDING APPARATUS DEVICE DRIVER
STEP 74 SEND OF DATA TO SUBSYSTEM BY RECORDING APPARATUS DEVICE DRIVER
STEP 75 SEND OF DATA TO MONITORING PROGRAM BY SUBSYSTEM
STEP 76 SEND OF DATA TO GDI32 BY WAY OF GDI32 MONITORING MODULE BY MONITORING PROGRAM
STEP 77 SEND OF DATA TO GDI BY GDI32
STEP 78 SEND OF DATA TO GRAPHICS DEVICE DRIVER BY GDI
STEP 79 SEND OF DATA TO GRAPHICS CARD BY GRAPHICS DEVICE DRIVER
STEP 80 SEND OF SCREEN IMAGE TO DISPLAY BY GRAPHICS CARD
 FIG. 10
REPORT
OOOOYOMOD
COMPUTER: CLIENT A
USER NAME: KOU
LOG-IN TIME: 14.00.03
LOG-OFF TIME: 17.04.01
NUMBER OF IMPROPER OPERATIONS: 3
ACCESS IP: 204 . . .
ACCESS TIME BAND: 14.04.13 TO 14.09.34
ACCESS IP: 176 . . .
ACCESS TIME BAND: 14.04.13 TO 14.09.34
ACCESS IP: 168 . . .
ACCESS TIME BAND: 14.04.13 TO 14.09.34
COMPUTER: CLIENT B
USER NAME: TAKA
LOG-IN TIME: 12.00.03
LOG-OFF TIME: 14.04.01
NUMBER OF IMPROPER OPERATIONS: 0
COMPUTER: CLIENT C
USER NAME: NO USER
LOG-IN TIME: Hr Min Sec
LOG-OFF TIME: Hr Min Sec
NUMBER OF IMPROPER OPERATIONS: TIMES
PAGE 1

The invention claimed is:

1. A computer monitoring method for monitoring a usage state of a computer based on actuation of the computer by an operating system and on recording of a display image displayed on a display apparatus of the computer, the method comprising:

acquiring, when data from the operating system or an application program actuated on the operating system is displayed on the display apparatus, a function to be executed by a subsystem that provides a graphics function of the operating system in order to create the display image by acquisition means that uses an input function or an output function of the subsystem;

extracting text data from the function by extraction means;

storing the text data in association with the function by storage means in a database stored in the computer or in a server connected by a network with the computer; and acquiring at least one of data selected from among an operation history of the application program, an operation history input by way of an input apparatus of the computer, a communication history of the computer, characteristic information of the computer, a raster data output from the subsystem and an execution time of the function; and correlatively storing the same in association with the text data or the function in the database, wherein the acquisition means comprises interface driver means that comprises a function for performing data transmission and reception with a device driver for controlling a device of the computer and a function for providing an interface shared by the operating system and the device driver and that is actuated in a kernel mode of the operating system, the interface driver means provides an interface between the operating system or the application program and the input function or the output function of the subsystem, and the function is acquired by way of the interface of the interface driver means.

2. The computer monitoring method according to claim 1, comprising:

searching the database by search means using a keyword in order to ascertain a usage state of the computer;

displaying a search result of the search by display means; and reproducing the image display by reproduction means in use of the function associated with the text data of a search result of the search and stored in the database.

3. A computer monitoring system for monitoring a usage state of a computer based on actuation of the computer by an operating system and recording of a display image displayed on a display apparatus of the computer, comprising the computer having:

acquisition means executed by the computer for, when data from the operating system or an application program actuated on the operating system is displayed on the display apparatus, acquiring a function to be executed by a subsystem that provides a graphics function of the operating system in order to create the display image in use of an input function or an output function of the subsystem;

extraction means for extracting text data from the function;

sending means for sending acquired data acquired by the acquisition means and the text data to the computer or a server connected via a network with the computer in which a database is stored;

acquisition means for acquiring the function by interface driver means that comprises a function for performing data transmission and reception with a device driver for controlling a device of the computer and a function for providing an interface shared by the operating system and the device driver and a function, being software actuated in a kernel mode of the operating system, for providing an interface between the operating system or the application program and the input function or the output function of the subsystem; and acquisition means for acquiring at least one of data selected from among an operation history of the application program, an operation history input by way of an input apparatus of the computer, a communication history of the computer, characteristic information of the computer, a raster data output from the subsystem and an execution time of the function.

4. The computer monitoring system according to claim 3, comprising the computer or the server having:

receiving means for receiving the data sent by the sending means; and storage means for storing in association with each other the acquired data and the text data contained in the data in the database.

5. The computer monitoring system according to claim 4, comprising the computer, the server or a second computer connected via a network to the server having:

search means for searching the database using a keyword in order to ascertain a usage state of the computer;

display means for displaying a search result of the search means; and reproducing means for reproducing the image display in use of the function associated with the text data of a search result of the search and stored in the database.

6. The computer monitoring system according to claim 5, comprising the computer, the server or the second computer having:

the interface driver means comprising a recording apparatus driver portion for taking data from the recording apparatus, and an interface portion for outputting data to a graphics device driver for generating the display image directly displayable in the display apparatus; and the reproducing means for reproducing the display image by acquiring the function stored in the database by the recording apparatus driver portion and output the same to the interface portion.

7. The computer monitoring system according to claim 4, comprising report production means for, in response to an instruction from a supervisor of the monitoring system or periodically, producing a report indicating a usage state of the computer based on the computer-related data stored in the database, the report being configured from characteristic information of the computer, user information indicating a user using the computer, time information indicating a time and a time band in which a user has used the computer, and irregular access information indicating execution of an improper program on the computer or information accessed from the computer to a network address that generates inappropriate information.

8. A monitoring system program for monitoring a usage state of a computer based on actuation of the computer by an operating system and on recording of a display image displayed on a display apparatus of the computer, the program causing the computer to execute:

an acquisition step in which, when data from the operating system or an application program actuated on the operating system is displayed on the display apparatus, a function to be executed by a subsystem that provides a graphics function of the operating system in order to create the display image is acquired using an input function or an output function of the subsystem;

an extraction step in which text data is extracted from the function;

a send step in which acquired data acquired in the acquisition step and the text data is sent to the computer or a server connected via a network with the computer in which a database is stored;

the acquisition step in which the function is acquired by interface driver program that comprises a function for performing data transmission and reception with a device driver for controlling a device of the computer and a function for providing an interface shared by the operating system and the device driver and a function, being software actuated in a kernel mode of the operating system, for providing an interface between the operating system or the application program and the input function or the output function of the subsystem; and the acquisition step in which at least one of data selected from among an operation history of the application program, an operation history input by way of an input apparatus of the computer, a communication history of the computer, characteristic information of the computer, a raster data output from the subsystem and an execution time of the function is acquired.

9. The monitoring system program according to claim 8, the program causing the computer or the server to execute:

a receive step in which the data sent in the sending step is received; and a storage step in which the acquired data and the text data contained in the data are associated with each other and stored in the database.

10. The monitoring system program according to claim 9, the program causing the computer, the server or a second computer connected via a network to the server to execute:

a search step in which the search is performed using a keyword in order to ascertain a usage state of the computer;

a display step in which a search result of the search is displayed; and a reproducing step in which the image display is reproduced in use of the function associated with the text data of a search result of the search and stored in the database.

11. The monitoring system program according to claim 10, wherein the interface driver program comprises a recording apparatus driver portion for taking data from the recording apparatus, and an interface portion for outputting data to a graphics device driver for generating the display image directly displayable in the display apparatus, the monitoring system program causing the computer, the server or the second computer to execute: a step for acquiring the function stored in the database by the recording apparatus driver portion; and a step for reproducing the display image based on output, to the interface portion, of data acquired by the recording apparatus driver portion.

12. The monitoring system program according to claim 9, the program causing the computer, the server or a second computer connected via a network to the server to execute:
    a data acquisition step in which the computer-related data is acquired from the database;
    an analysis step in which the computer-related data is analyzed; and
    a report production step in which a result of the analysis step is compiled to produce a report.

13. The monitoring system program according to claim 12, wherein the report production step is executed in response to an instruction from a supervisor of the monitoring system or periodically to produce the report,
    the report being configured from characteristic information of the computer, user information indicating a user using the computer, time information indicating a time and a time band in which a user has used the computer, and irregular access information indicating execution of an improper program on the computer or information accessed from the computer to a network address that generates inappropriate information.

14. A computer-readable storage medium in which the monitoring system program of claim 8 is recorded.

\* \* \* \* \*